Patented Sept. 13, 1949

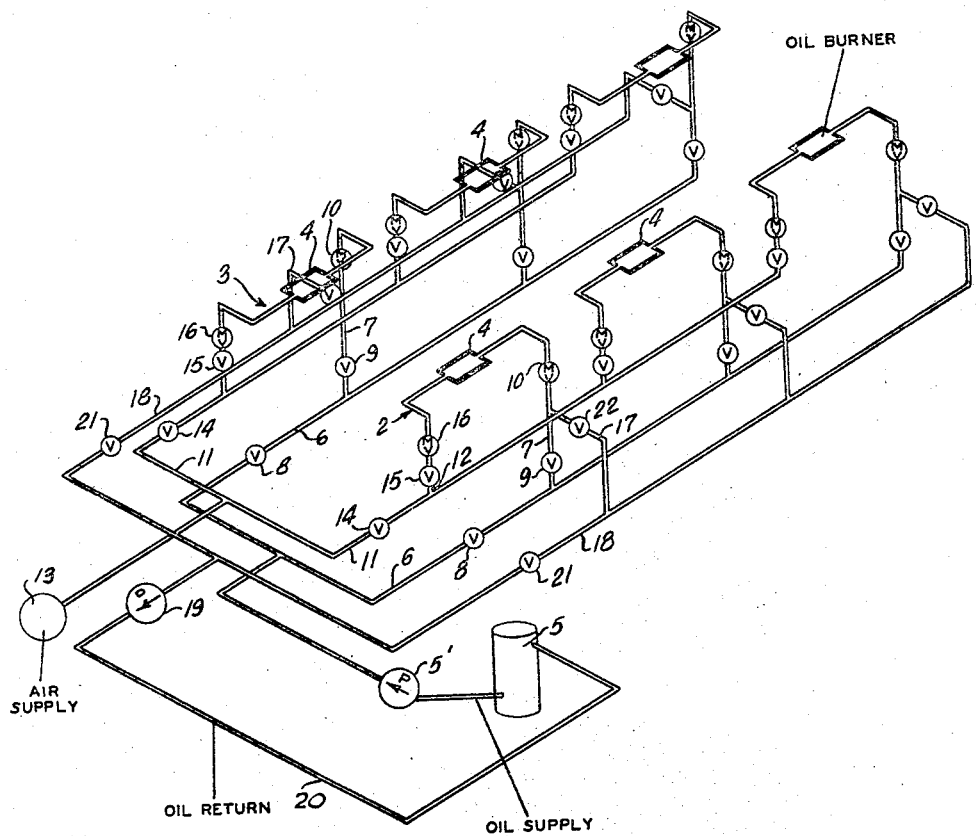

2,481,491

UNITED STATES PATENT OFFICE 2,481,491

FUEL OIL SYSTEM FOR FEEDING A PLURALITY OF BURNERS, INCLUDING MEANS FOR EMPTYING UNUSED OIL

Le Roy D. Bishop, Manheim Township, Lancaster County, Pa., assignor to Armstrong Cork Company, Lancaster, Pa., a corporation of Pennsylvania Application December 30, 1942, Serial No. 470,651

4 Claims. (Cl. 158—36.3)

1

This invention relates to heating systems and, more particularly, to a glass furnace heating system in which two series of oil burners are used alternately to heat the furnace and means are provided to evacuate or empty the series of oil burners not in use to obviate drooling of oil therefrom.

In heating systems for glass furnaces, generally a series of oil burners are provided on each side of the furnace and such series are fired alternately, the idle series being moved automatically out of firing position. During idle periods of the complete firing cycle, the oil in the idle series is free to drool on the furnace walkways and to carbonize on the burner tips. This, obviously, renders it extremely difficult to keep the furnace walkways clean and materially detracts from the efficient and economical operation of the heating system. Standard practice in the industry comprises blowing the oil in idle burners into the furnace by means of compressed air. This entails a complicated pipe and valve arrangement which is extremely expensive in maintenance and installation costs and which, as a matter of fact, is ineffective for its intended purpose for oil is permitted to drool from the burner tips during idle periods after an extremely limited time in service.

The chief object of my invention is to provide an oil-burning heating system for glass furnaces including means to empty or remove unused oil from oil burners and their oil supply lines during idle periods of the complete firing cycle. An object of my invention is to provide an oil-burning heating system for glass furnaces in which suction means are provided to remove unused oil from the oil burners and their oil supply lines in a direction opposite the direction of normal flow of the oil. A still further object is to provide evacuating means for oil-burning heating systems adapted to withdraw unused oil from the oil burners and their oil supply lines during idle periods. A still further object is to provide an oil burning heating system including a suction pump for removing unused oil from a series of oil burners during idle periods in a direction opposite the direction of normal flow of the oil. Other objects of my invention will be apparent from the following description.

This invention relates to an oil-burning heating system for glass furnaces comprising, in combination, a series of burners movable into firing position, a second series of burners movable into firing position alternately with the first series, an oil supply connected to both series of burners, means for rendering one of said series inactive,

2 and means for withdrawing oil from the inactive series in a direction opposite the direction of normal flow during its inactive period to prevent drooling of oil.

The attached drawing is a schematic view of an oil-burning heating system for glass furnaces including the evacuating means of my invention.

Referring to the drawing, there is shown an oil-burning heating system for glass furnaces comprising two separate series 2 and 3 of oil burners 4, each series being movable automatically into firing position and being operable alternately to heat the furnace. The various burners 4 are illustrated diagrammatically since the structure per se of the burner forms no part of my invention. A main oil supply 5 supplies oil to a pump 5' which places the oil under pressure and supplies the oil by conduits or pipe lines 6 and 7 to the burners 4. Disposed within pipe line 6 are valves 8 each adapted to shut off the flow of oil to all of the burners 4 of a series; in pipe lines 7 there are disposed valves 9 adapted to shut off the flow of oil to each individual burner 4 of a series. Meter valves 10 are disposed in pipe lines 7 and serve to meter the amount of oil fed to each burner 4.

Air lines 11 and 12 are provided to supply each of the burners 4 of series 2 and 3 with compressed air from an air supply 13. Valves 14 are placed in air line 11 and each is adapted to shut off the flow of air to all of the burners of a series; valves 15 are placed in air lines 12 to shut off the flow of air to each individual burner of a series. Meter valves 16 are also placed in the air lines 12 to meter the flow of air to each burner.

Connected to each pipe line 7 leading to the individual burners 4 above valves 9 is a pipe line 17 connected to pipe lines 18 leading to a rotary suction pump 19. Pump 19 is connected by pipe line 20 to the main oil supply 5. Valves 21 are placed in line 18 and may be used to close line 18; valves 22 are placed in lines 17 and may be used to close such lines individually.

To aid in a full understanding of my invention, I will describe the method of operation of the system. It will be assumed that series 2 is in operation, that series 3 is idle and that the operating series of burners is about to be alternated. Series 2 of burners 4 is shut off automatically and removed from firing position while at the same time series 3 of burners 4 is moved into firing position and ignited, oil flowing thereto in its normal direction from the main oil supply 5. While series 2 has been rendered idle it will be understood that oil remains in the supply line 7 and in the burners 4 and that such oil need be removed to prevent drooling into the furnace. The valves in lines 17 and line 18 leading to series 2 are opened, suction pump 19 is actuated and serves to withdraw oil from the burners 4 and the supply lines 7 into pipe lines 17 and into pipe line 18 leading to the pump 19. The pump 19 then returns the unused oil by pipe line 20 to the main oil supply 5. The pump 19 may be operated only for a short portion of the idle cycle but it may be desirable under some circumstances that it be operated during the entire idle cycle of the series since this definitely obviates drooling and subsequent carbonizing on the burner tips as well as assures that the furnace walkways will be maintained in a clean, sanitary condition.

My invention provides an oil burning heating system for glass furnaces which is clean and sanitary in operation and which definitely prevents drooling of unused oil on the walkways of the furnaces and carbonization of unused oil on the burner tips of the various series of burners. My invention prevents waste of unused oil contained in the supply lines and the burners during their idle cycle and not only removes such oil to prevent drooling but returns the unused oil to the main oil supply thus assuring its subsequent use. The device of my invention is economical in initial cost and in operation and does not require skilled labor in its operation. It is quickly and readily placed in operation and when in operation requires little or no attention or maintenance.

While I have described and illustrated a preferred embodiment of my invention it will be understood my invention is not limited thereto since it may be otherwise embodied within the scope of the following claims.

I claim:

1. In an oil-burning heating system for glass furnaces, the combination of a series of burners, a second series of burners adapted to be fired alternately with said first series, an oil supply, conduits connecting the oil supply with both said series of burners, a pressure pump connected to said oil supply and said conduits for transferring oil from said supply to said burners through said conduits, means for discontinuing the flow of oil to one of said series of burners, and a suction pump connected to said conduits adapted to withdraw oil from said conduits and said discontinued series of burners in a direction opposite the direction of normal flow during its inactive period to prevent drooling of oil from the burners.

2. In an oil-burning heating system, the combination of a series of burners, an oil supply, conduits connecting the oil supply with the various burners of the series, a pressure pump connected to said oil supply and said conduits for transferring oil from said supply to said burners through said conduits, means for discontinuing the flow of oil to a burner of said series, and a suction pump connected to said conduits adapted to withdraw oil from the conduits and said discontinued burner in a direction opposite the direction of normal flow to prevent drooling of oil from the inactive burner.

3. In an oil-burning heating system for glass furnaces, the combination of a series of burners, a second series of burners adapted to be fired alternately with said first series, an oil supply, conduits connecting the oil supply with both series of burners, a pressure pump connected to said oil supply and said conduits for transferring oil from said supply to said burners through said conduits, valves in said conduits for stopping oil flow to said series of burners, and a suction pump connected to said conduits, said suction pump being actuatable to withdraw oil from said conduits and a series of burners in a direction opposite the direction of normal flow upon the stoppage of oil flow to said series.

4. In an oil burning heating system, the combination of an oil burner, an oil supply, a supply conduit connecting the oil supply with said burner, a pressure pump connected to said oil supply and to said supply conduit for transferring oil from said supply to said burner through said supply conduit, a valve for closing said supply conduit, an oil return conduit interconnected with said supply conduit and said burner, and a suction pump connected to said oil return conduit to withdraw oil from said burner and said supply conduit, in a direction opposite the direction of normal flow, upon closing of the valve in the supply conduit.

LE ROY D. BISHOP.

REFERENCES CITED

The following references are of record in the file of this patent:

UNITED STATES PATENTS

| Number | Name | Date |
|---|---|---|
| 1,416,424 | Seymour | May 16, 1922 |
| 1,428,793 | McGahan | Sept. 12, 1922 |
| 1,431,054 | Stockstrom | Oct. 3, 1922 |
| 1,610,290 | Jones et al. | Dec. 14, 1926 |
| 1,628,424 | Peabody | May 10, 1927 |
| 1,742,887 | Williams | Jan. 7, 1930 |
| 1,783,405 | Celander | Dec. 2, 1930 |
| 1,825,372 | Sykes | Sept. 29, 1931 |
| 1,858,302 | Marshall | May 17, 1932 |
| 1,876,509 | Stevens | Sept. 6, 1932 |
| 1,884,256 | Rogers et al. | Oct. 25, 1932 |
| 1,911,902 | King et al. | May 30, 1933 |

FOREIGN PATENTS

| Number | Country | Date |
|---|---|---|
| 525,509 | Germany | May 26, 1931 |